United States Patent
Baeuerle et al.

(10) Patent No.: US 6,513,328 B2
(45) Date of Patent: Feb. 4, 2003

(54) INTERNAL COMBUSTION ENGINE WITH COOLING CIRCUIT AND HEATING HEAT EXCHANGER CONNECTED TO IT

(75) Inventors: Michael Baeuerle, Markgroeningen (DE); Klaus Ries-Mueller, Bad Rappenau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/863,983

(22) Filed: May 23, 2001

(65) Prior Publication Data

US 2002/0029570 A1 Mar. 14, 2002

(30) Foreign Application Priority Data

May 23, 2000 (DE) .......................................... 100 25 500

(51) Int. Cl.⁷ ................................................. F02B 29/04
(52) U.S. Cl. ........................... 60/599; 60/605.1; 60/604
(58) Field of Search ............................. 60/605.1, 605.2, 60/599, 604

(56) References Cited

U.S. PATENT DOCUMENTS

| | | | | |
|---|---|---|---|---|
| 3,796,046 A | * | 3/1974 | Klaue et al. .................. 60/619 |
| 4,010,613 A | * | 3/1977 | McInerney .................... 60/599 |
| 4,367,626 A | * | 1/1983 | Schwartzman ............... 60/606 |
| 5,740,786 A | * | 4/1998 | Gartner ....................... 123/570 |
| 6,176,082 B1 | * | 1/2001 | Shaffer ......................... 60/321 |
| 6,244,256 B1 | * | 6/2001 | Wall et al. ............... 123/568.1 |

FOREIGN PATENT DOCUMENTS

DE 196 39 146 C1 11/1997
EP 0 607 523 B1 5/1997

OTHER PUBLICATIONS

Automobilische Zeitschrift 100 (1998) 7/8, Friedrich Vieweg & Sohn Verlagsgesellschaft mbH, In Der GWV Verlagsgesellschaft . . . , pp 486 and 488.

* cited by examiner

Primary Examiner—Hoang Nguyen
(74) Attorney, Agent, or Firm—Michael J. Striker

(57) ABSTRACT

An internal combustion has an exhaust gas line, an exhaust gas heat exchanger through which exhaust gas withdrawn through the exhaust gas line passes so as to take heat energy, a heating heat exchanger to which the withdrawn heat energy is made available and which is connected to a cooling fluid circuit of the internal combustion engine, an exhaust gas turbocharger provided with a turbine housing and a turbine wheel rotatable in the latter, the exhaust gas turbocharger being arranged in the exhaust gas line, the exhaust gas heat exchanger being connected heat conductively with the turbine housing of the exhaust gas turbocharger for withdrawing of heat from the exhaust gas which passes through the turbine wheel.

5 Claims, 2 Drawing Sheets

INTERNAL COMBUSTION ENGINE WITH COOLING CIRCUIT AND HEATING HEAT EXCHANGER CONNECTED TO IT

BACKGROUND OF THE INVENTION

The present invention relates to an internal combustion engine which has a cooling circuit and a heating heat exchanger connected to it.

The German patent document DE 196 39 146 discloses an internal combustion engine with an exhaust gas line in which an exhaust gas catalyst is arranged, with an exhaust gas turbo-charger whose exhaust gas turbine is located upstream of the exhaust gas catalyst in the exhaust gas line, with a bypass conduit which on the one hand opens upstream of the exhaust gas turbine and on the other hand opens between the exhaust gas turbine and the exhaust gas line, with a controllable bypass valve in a bypass conduit, and with means for controlling the bypass valve. The bypass control means for the bypass valve after the start of the internal combustion engine and during a catalyst heating time period is partially open by a motor load below a predetermined motor load threshold value, and is held closed with the motor load above the motor load threshold value. This at least partial opening of the bypass valve after the start of the motor and thereby in idle running or at low motor load has the advantage of an accelerated heating of the catalyst, so that it takes earlier its associated objective of catalytic action than after the start of the internal combustion engine when all exhaust gas exiting the same flows to a turbine housing and turbine wheel of the exhaust gas turbocharger. For providing such at least partial opening of the bypass valve during idle running of the internal combustion engine, a so-called bi-pressure box is utilized as a control means for the bypass valve. It is subdivided by a diaphragm piston into two pressure chambers. One pressure chamber is controlled with the use of an electrically controllable 3/2 displacement valve by a control device operating with pulse width modulation, and adjusts a pressure between a synthetic pressure and a bearing pressure in the pressure chamber producible by the exhaust gas turbocharger. The other pressure chamber provides by a further electrically controllable 3/2 displacement valve a pressure between the atmospheric pressure and occasional subatmospheric pressure within a suction conduit of the internal combustion engine. The above mentioned patent mentions that alternatively to the bi-pressure box and thereby also to the both associated 3/2 displacement valves on the other hand, conventional adjustments for the bypass valve can be used as well.

Such adjustment means are disclosed for example in the European patent document EP 0 607 523. This adjustment means combine from the mono-pressure box, only an electronically controllable 3/2 displacement valve, and an air pump which supplies the 3/2 displacement valve at least at the inlet side when the exhaust gas turbocharger does not produce any low pressure or must produce. Instead of the both means for controlling the bypass valve which derive there adjusting force from air pressure differences, alternatingly also combinations of electric motors and mechanical transmissions driven by them are possible.

It is known in ATZ Automobiltechnische Zeitschrift 100 (1998) 7/8, Friedrich Vieweg & Sohn Verlagsgesellschaft mbH in the GWV Verlagsgesellschaft mbH, Posffach 15 46, D-65005 Wiesbaden, pages 486 through 488, that additionally to this heat from a cooling fluid of an internal combustion engine, also use of waste heat for a consumer-neutral heating power increases a vehicle passenger salon heating. For this purpose downstream of a catalyst which is provided on the internal combustion engine, a so-called exhaust gas deflector is provided which has a first outlet and a second outlet. The first outlet opens into a bypass conduit and the second outlet opens into an exhaust gas heat exchanger which in turn opens to a noise damper. Depending on the position of the exhaust gas deflector, exhaust gas flows to the bypass and also past the exhaust gas heat exchanger or the exhaust gas is supplied by adjusting the exhaust gas deflector through the exhaust gas heat exchanger so that the exhaust gas heat exchanger can withdraw heat from the exhaust gas.

This heat is supplied to a heating heat exchanger by a circulation circuit. Through a further connection also cooling fluid which is heated by the internal combustion engine is supplied to the heating heat exchanger, so that the heating heat exchanger belongs to two liquid circuits and therefore has a complicated construction. Another disadvantage is the technical expenses for the exhaust gas deflector. Since these exhaust gas deflectors contain a controllable flap which does not exclude a leakage flow, an additional heat exchanger is introduced into the circulation circuit for the purpose of avoiding, for example in summer, an undesired heating or even overheating of the exhaust gas heat exchanger by withdrawal of heat to the cooling circuit of the internal combustion engine. Naturally, an additional heat exchanger and a cooler of the cooling circuit adapted to it, increase technical expenses and therefore the price of a vehicle.

SUMMARY OF THE INVENTION

Accordingly, it is an object of the present invention to provide an internal combustion engine with a cooling circuit and a heating heat exchanger connected to it, which avoids the disadvantages of the prior art.

In keeping with these objects and with others which will become apparent hereinafter, one feature of the present invention resides, briefly stated, in an internal combustion engine which has an exhaust gas line; an exhaust gas heat exchanger through which exhaust gas withdrawn through said exhaust gas line passes so as to withdrew heat energy; a heating heat exchanger to which the withdrawn heat energy is made available and which is connected to a cooling fluid circuit of the internal combustion engine; an exhaust gas turbocharger provided with a turbine housing and a turbine wheel rotatable in the latter, said exhaust gas turbocharger being arranged in said exhaust gas line, said exhaust gas heat exchanger being connected heat-conductively with said turbine housing of said exhaust gas turbocharger for withdrawing of heat from the exhaust gas which passes through said turbine wheel.

When the internal combustion engine with an exhaust gas turbocharger is designed in accordance with the present invention, heat of the exhaust gas of the internal combustion engine in the immediate vicinity to the latter is taken through the wall of a turbine housing of the turbocharger for heating purposes. This makes possible, to supply the heating heat exchanger with an additional heat through a short additional cooling medium conduit portion and thereby to avoid the expenses for an exhaust gas deflector described in the above mentioned publication and therefore a complicated construction of the exhaust gas device.

In accordance with another feature of the present invention, the internal combustion engine has said turbine housing formed at least partially with an additional wall to form a hollow chamber provided with an inlet connection and an outlet connection for supplying and withdrawing of heat receiving cooling fluid upstream of said heating heat exchanger. This provides for a one-piece construction of the turbine housing of the exhaust gas turbocharger with the exhaust gas heat exchanger. Since for navigation the exhaust gas turbocharger with a liquid cooling of the turbine housing is acceptable, with this construction corresponding know-how can be taken as well.

In accordance with a further feature of the present invention, the internal combustion engine has a heating line leading to said heating heat exchanger, a directional valve arranged in said heating line, and a supply line leading from said directional valve to said exhaust gas heat exchanger, and directional valve is controllable so that cooling fluid which comes through said heating line is controllably distributed to said heating heat exchanger and/or said exhaust gas heat exchanger.

The advantage of this construction is that the exhaust heat exchanger operates by passing the cooling fluid selectively, for example to supply heat in winter to the heating heat exchanger and in summer, when only a little heating heat is needed, it is not filled, or in summer, and in the event of high thermal loads of the exhaust gas line it is used so as to cool the turbine housing and thereby the exhaust gas turbocharger and the exhaust gas.

In accordance with still a further feature of the present invention said directional valve is electrically controllable. This construction makes possible the passage of a cooling fluid through the exhaust gas heat exchanger for controlling by electrical control current, which are provided by a control device made in the internal combustion engine in dependence on preselected parameters. One of these parameters is for example the corresponding position of a heating adjustment lever or the like. For example, a simple flow of the exhaust gas heat exchanger can be suppressed when a fast heating of the catalyst is desired. Then, when cooling medium does not flow through the exhaust gas heat exchanger, the corresponding partial flow of exhaust gas which flows with the open bypass valve directly through the turbine wheel is cooled less.

In accordance with still a further feature of the present invention said directional valve is a three-two directional valve. With this construction a valve arrangement is provided which can be produced in a price-favorable manner.

Finally, in accordance with another advantageous feature of the present invention a check valve is located between said outlet connection of said exhaust gas heat exchanger and an inlet side of said heating heat exchanger, and the check valve is openable toward said heat exchanger. In this construction a pressure limiting valve for avoiding undesirable pressure increase in the exhaust gas heat exchanger is provided with the use of the 3/2 displacement valve with the advantage that the hollow chamber of the exhaust gas heat exchanger is for example emptied by evaporation of the cooling fluid. Therefore the temperature of the exhaust gas turbocharger can be increased over an evaporation temperature associated with the vapor pressure of the cooling circuit. Such a temperature increase can be desired for an efficient operation of the catalyst arranged after it.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
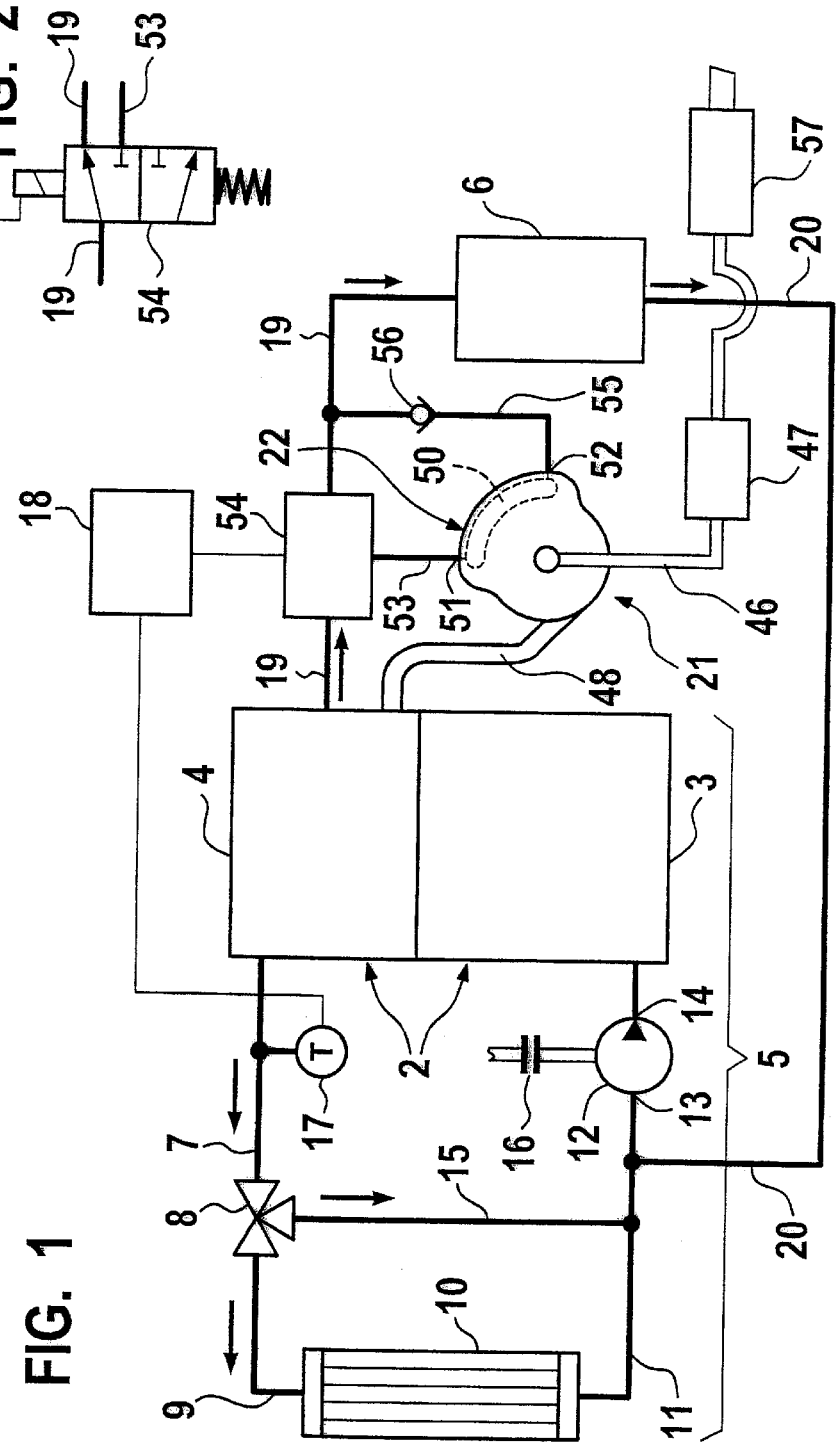
FIG. 1 is a view showing an internal combustion engine with a cooling circuit and a heating heat exchanger connected to it in accordance with the present invention, in a schematic illustration.

An internal combustion engine schematically shown in FIG. 1 is identified with reference numeral 2. It has a cylinder block 3 and a cylinder head 4. It is provided with a cooling circuit which communicates with a heating heat exchanger 6. The heating heat exchanger 6 serves for example for heating a vehicle passenger with a heated air and also for supplying the heated air for unfreezing of at least one windshield. The heating heat exchanger 6 can be formed as a heating heat exchanger of a known type.

The cooling circuit 5 includes a cooling fluid line 7 extending from the cylinder head 4, a thermostat valve 8 connected to it, a further cooling fluid line 9 extending from the thermostat valve 8, a cooler 10 connected to the cooling fluid line 9 for example of a known type, a return line 11 connected to the cooler 10, a cooling fluid pump 12 with an inlet 13 which is supplied at least from the return line 11 and an outlet 14 which is connected with a cylinder block 3. It also includes a bypass line 15 which also extends from the thermostat valve 8 and opens into the return line 11.

The cooling fluid system 10 is for example controlled to be driven via a coupling 16 from the internal combustion engine 2 in a not shown manner, or the cooling fluid pump 12 has a not shown its own electric drive motor as known from persons skilled in the cooling systems of an internal combustion engine.

The pump power of the cooling fluid pump 12 is for example automatically adjustable, starting from the temperature of a cooling fluid which flows through the cooling fluid line 7. For this purpose the thermostat 17 is combined with the cooling fluid line 7 so that the thermostat 17 exactly determines the cooling fluid temperature. A control device 18 is connected with the thermostat 17. It controls the coupling 16 in a predetermined manner or alternatively controls the above mentioned electric pump drive motor. When the thermostat valve 8 of the known type connects the cooling fluid line 7 with the cooling fluid line 9 and the bypass line 15 is substantially insulated from the cooling fluid line 7, the control device 18 operates so that the pump power, is dependence on the increasing temperature at the thermostat 17 and the cooling fluid pump 12, increases the circulation of the cooling fluid so that a disadvantages temperature increase is not obtained despite the complete power loading of the internal combustion engine in summer.

In particular in winter with low temperatures and cold fluid, the thermostat valve 8 operates so that the cooling fluid coming from the cooling fluid lines 7 predominantly bypasses the cooler 10 and thereby flows through the bypass conduit 15. When during the cooling fluid circulation through the bypass conduit 15 the cooling fluid temperature is sufficiently increased, the thermostat valve 8 releases more or less the path of the cooling fluid through the cooler 10.

At cool temperatures, a vehicle driver demands heat from the heating heat exchanger 6. For obtaining by the heating heat exchanger the heat which is required for this from the cooling fluid of the internal combustion 2, a heating line 19 extends from the cylinder head 4. For example in the manner disclosed in the prior art, this heat line extends to the heating heat exchanger 6. A heating return line 20 extends from the heating heat exchanger 6 to a cooling circuit back and there into the return line 11. Therefore the cooling fluid which flows from the cylinder 4 through the heating line 19 into the heating heat exchanger 6 is supplied back to the cooling fluid pump 12 and in the internal combustion engine 2. It is to be understood that with cooler cooling fluid the thermostat valve 8 has a substantial flow resistance before the cooling fluid line 9 and in a sufficient quantity also before the bypass conduit 15, so that a desire partial quantity of the cooling fluid flow which is produced by the cooling fluid pump 12 is available for flowing through the heating heat exchanger 6 and thereby for heating purposes.

Summarizing the above, it can be said that the internal combustion engine 2 is a heat source for the supply of the heating heat exchanger 6.

Figure 3:
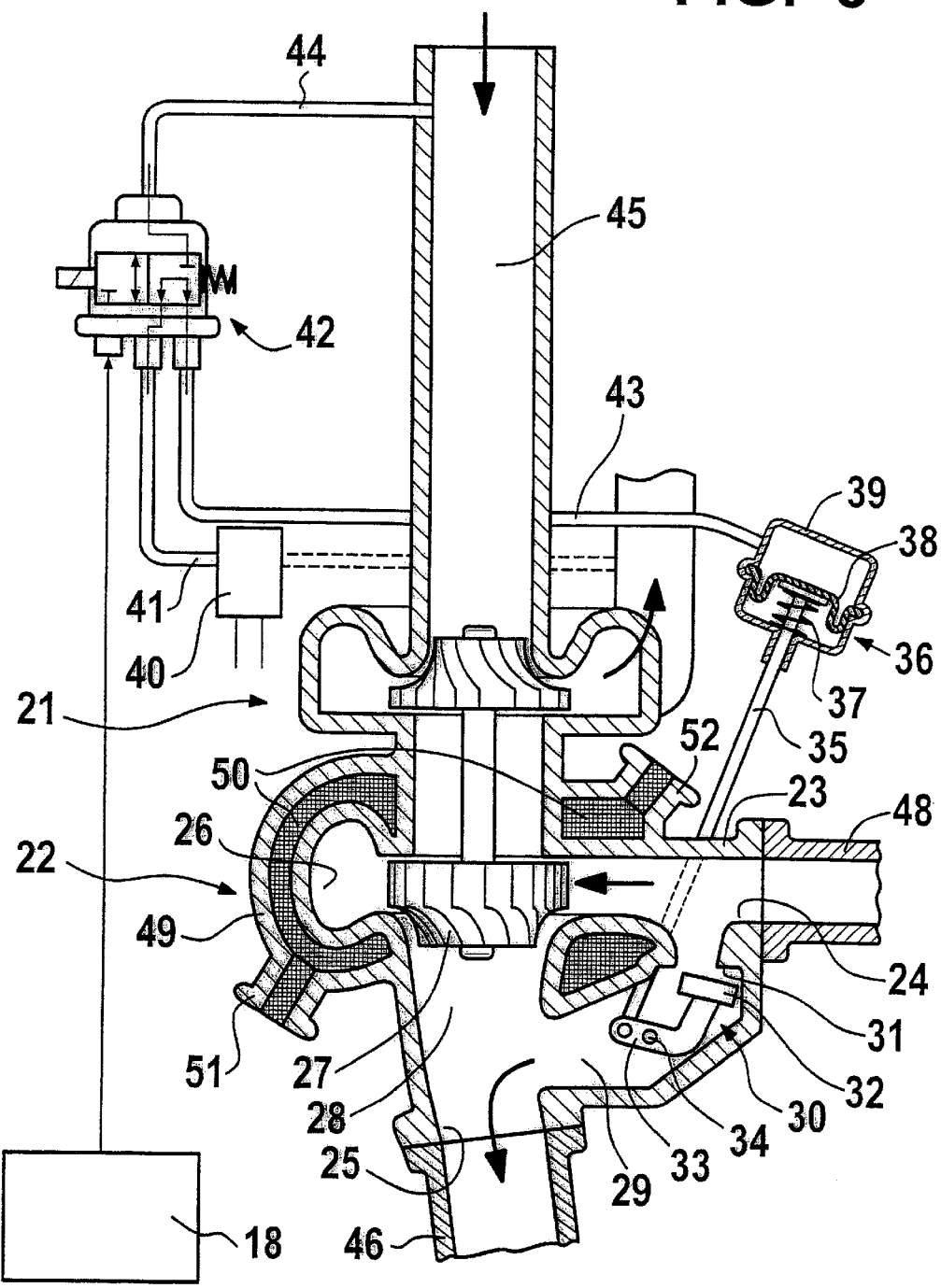
FIG. 3 is a view showing a further detail of the internal combustion engine of FIG. 1 in accordance with the present invention in a section.

As an additional heat source in accordance with the present invention, an exhaust gas heat exchanger 22 with an exhaust gas turbocharger 21 is provided. The exhaust heat exchanger 22 is shown in FIG. 1 schematically, while the exhaust gas turbocharger 21 is shown in FIG. 3 together with the exhaust gas heat exchanger in a longitudinal section. FIG. 3 shows a turbine housing 23 of the exhaust gas turbocharger with an inlet 24 and an outlet 25. Between the inlet and the outlet, on the one hand the turbine housing 23 is formed as a so-called spiral housing and has a spirally shaped passage 26 which is open radially inwardly to a turbine wheel 27. A passage 28 is connected axially to the turbine wheel 27 and leas to the outlet 25. On the other hand, a bypass passage 29 leads from the inlet 24 to the outlet 25. A bypass valve 30 is mounted in the bypass passage 29. It has a valve seat 31 and a valve closing body 32 which is pressed against the valve seat. This construction substantially corresponds to the construction of the exhaust gas turbocharger disclosed in the European patent document EP 0 607 523 B1. The valve closing body 32 is coupled with a lever arm 33 which is turnably supported by means of an axle 34. The lever arm 33 is turnable by an adjusting rod 35 which extends from an adjusting drive 36. The adjusting drive 36 has a spring 37 which can be moved through the adjusting rod 35 at the lever arm 33 of the valve closing body 32 to the opening position. Therefore exhaust gas can flow to the bypass passage 29. A diaphragm 38 (flexible wall) is combined with the adjusting rod 35 so that, a pressure loading of the diaphragm in direction against the spring 37 moves the adjusting rod 35 with overcoming a restoring force of the spring 37, and in this way the valve closing body 32 can movably open the valve seat 31.

In order to load the diaphragm 38 (flexible wall) with pressure, it is mounted at an edge-side tightly in a pressure cell 39. A pressure for loading the diaphragm 38 (flexible wall) can be supplied for example by an air pump 40 as disclosed in the European patent document EP 0 607 529 B1. The pressure applied by the air pump 40, is supplied through a line 41 of an electrically controllable valve 42, which is here formed as 3/2 directional valve. Depending on the position of the 3/2 directional valve 42, the air pump 40 applies pressure through the valve 42 and the lines 43, 44 against the diaphragm 35 (flexible wall) or controlling the bypass valve 30. The 3/2 directional valve 42 is controllable by the control device as disclosed in the patent EP 0 607 523 B1. On the other hand, it is controlled so that during start of the internal combustion to the bypass valve 30 is preferably completely open and then is closed at least partially, when for a driving operation of the internal combustion engine a torque is required, which is not producible by means of the combustion air aspirated by the internal combustion engine. Such a type of the control of the bypass valve 30 acts so that, a catalyst 47 which is arranged on the outlet lines 14 extending from the an outlet line 46 can contain possibly a lot of exhaust heat. This exhaust gas is supplied to the inlet 24 by an exhaust gas conduit 48 which extends from the cylinder 4 of the internal combustion engine 2.

In the embodiments shown in FIGS. 1 and 3 the exhaust gas heat exchanger is formed by a wall 49 which sealingly encloses the spiral turbing housing 23 at a distance from it, so that between the spiral turbine housing 23 and the wall 39 a hollow chamber 50 is provided. The hollow chamber 50 has an inlet connection 51 and an outlet connection 52, and the cooling fluid flows through it. The shape of the wall 39 and thereby the design of the hollow chamber 50 can be for example formed as in water-cooled exhaust gas turbochargers which are used in marine applications. No further description in detail is needed therefore, and the turbochargers for water cooling are supplied for example by the company 3K-Warner.

Alternatively to a cast hollow chamber 50, a tubular conduit with a round or a non-round cross-section can be mounted in a heat-conductive contact on the turbine housing of the turbocharger 27.

In accordance with FIG. 1, the exhaust gas heat exchanger 22 is supplied through its connection 51 from a supply line 53 which is connected to a directional valve 54. In the embodiment shown in FIG. 2 this directional valve 54 is formed as an electrically controlled pre-tool directional valve which is mounted in the heating line 19. In its basic position it holds the heating line 19 open for a through flow up to the heating heat exchanger 6. With an electrical control, the directional valve 54 is controllable in a position in which the heating heat exchanger 6 is uncoupled from the cylinder head 4 and thereby the exhaust gas heat exchanger 2 is connected with the cylinder head 4. Therefore it is possible to supply cooling fluid from the cylinder head 4 at such a temperature as it has at the outlet from the cylinder head 4 to the heating heat exchanger 6, or to supply the cooling fluid through the exhaust gas heat exchanger 22 and supply by means of a return line 55 which extends from its outlet connection 52 and through a longitudinal portion of the heating line 19, to the heat exchanger 6. Therefore there is a possibility to supply the cooling fluid which comes from the cylinder head 4 for improving the heating power on the bypass through the exhaust gas heat exchanger 22 and therefore to supply additionally thermal energy to the heating heat exchanger 6. On the other hand, it is possible, when the catalyst 57 has a temperature under its operational temperature to supply the cooling fluid over the exhaust gas heat exchanger 22 and thereby to use a possible fast temperature increase of the exhaust gas turbocharger and therefore a temperature increase at the catalyst.

A check valve 56 is mounted for example in the return line 55. It opens when a cooling fluid pressure at the outlet connection 52 of the exhaust gas heat exchanger 22 starts to exceed a cooling fluid pressure at an inlet side of the heating heat exchanger 6. Thereby when the cooling fluid is available in the hollow chamber 50 and the directional valve 54 assumes its basic position shown in FIG. 2 an undesirable pressure increase in the hollow chamber 50 is avoided. An expansion of the cooling fluid available in the hollow chamber 50 is also possible. Furthermore, it is also possible occasionally with the vapor bubble formation inside the hollow chamber 50 to limit the vapor pressure to such a pressure for which the cooling circuit 5 is arranged.

It is also possible to measure the temperature of the catalyst by a not shown thermometer which is known for monitoring the temperature of a catalyst, and indicates the temperature to the control device 18. The control device 18, because of the indicated catalyst temperature, decides to what extent to provide a heat exchange at the heating heat exchanger 6. It is also possible that the directional valve 54 operates with a cycled current, so that the catalyst 47 and also the heating heat exchanger 6 are supplied with heat from exhaust gas in a for example adjustable ratio.

In order to be complete it should be mentioned that after the catalyst 47, at least one noise damper 57 can be arranged.

Figure 2:
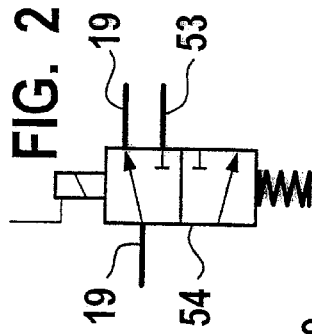
FIG. 2 is a view showing a detail of the internal combustion engine of FIG. 1 in accordance with the present invention.

It should be mentioned that in deviation from FIG. 2 in the basic position of the directional valve 54, the connection between the cylinder head 4 and the exhaust gas heat exchanger can be open so that the cooling fluid can flow into the exhaust gas heat exchanger 22. Therefore when a heating of the catalyst 47 has at least partial preference, then the directional valve 54 by means of current which operates the control device 18 controls the directional valve 54 to such a position that the flow of cooling fluid from the cylinder head 4 can flow at least partially over the exhaust gas heat exchanger 22 to the heating heat exchanger 26.

It will be understood that each of the elements described above, or two or more together, may also find a useful application in other types of constructions differing from the types described above.

While the invention has been illustrated and described as embodied in internal combustion engine with cooling circuit and heating heat exchanger connected to it, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. An internal combustion engine, comprising an exhaust gas line; an exhaust gas heat exchanger through which exhaust gas withdrawn through said exhaust gas line passes so as to take heat energy; a heating heat exchanger to which the withdrawn heat energy is made available and which is connected to a cooling fluid circuit of the internal combustion engine; and exhaust gas turbocharger provided with a turbine housing and a turbine wheel rotatable in the latter, said exhaust gas turbocharger being arranged in said exhaust gas line, said exhaust gas heat exchanger being arranged heat conductively at said turbine housing of said exhaust gas turbocharger for withdrawing of heat from the exhaust gas which passes through said turbine wheel, said turbine housing being formed at least partially with an additional wall and forming a hollow chamber provided with an inlet connection and an outlet connection for supplying and withdrawing of heat receiving cooling fluid upstream of said heat exchanger.

2. An internal combustion engine as defined in claim 1; and further comprising a heating line leading to said heating heat exchanger; a directional valve arranged in said heating line; and a supply line leading from said directional valve to said exhaust gas heat exchanger, said directional valve being controllable so that cooling fluid which comes through said heating line is controllably distributed to said heating heat exchanger and/or said exhaust gas heat exchanger.

3. An internal combustion engine as defined in claim 1, wherein said directional valve is electrically controllable.

4. An internal combustion engine as defined in claim 1, wherein said directional is a 3/2 directional valve.

5. An internal combustion engine, comprising an exhaust gas line, an exhaust gas heat exchanger through which exhaust gas withdrawn through said exhaust gas line passes so as to take heat energy; a heating heat exchanger to which the withdrawn heat energy is made available and which is connected to a cooling fluid circuit of the internal combustion engine; exhaust gas turbocharger provided with a turbine housing and a turbine wheel rotatable in the latter, said exhaust gas turbocharger being arranged in said exhaust gas line, said exhaust gas heat exchanger being arranged heat conductively at said turbine housing of said exhaust gas turbocharger for withdrawing of heat from the exhaust gas which passes through said turbine wheel; a heating line leading to said heating heat exchanger; a directional valve arranged in said heating line; a supply line leading from said directional valve to said exhaust gas heat exchanger, said directional valve being controllable so that cooling fluid which comes through said heating line is controllably distributed to said heating heat exchanger and/or said exhaust gas heat exchanger, said directional valve being formed as 3/2 directional valve; and a check valve located between said outlet connection of said exhaust gas heat exchanger and an inlet side of said heating heat exchanger, said check valve being openable toward said heat exchanger.

* * * * *